(No Model.)

A. JOHNSTON.
BELT FASTENING.

No. 269,579. Patented Dec. 26, 1882.

Witnesses
Rudolf A. Kjellman
Thomas E. Crosman

Inventor
Abner Johnston
by James A. Whitney
Attorney

UNITED STATES PATENT OFFICE.

ABNER JOHNSTON, OF BAINBRIDGE, NEW YORK.

BELT-FASTENING.

SPECIFICATION forming part of Letters Patent No. 269,579, dated December 26, 1882.

Application filed October 17, 1882. (No model.)

*To all whom it may concern:*

Be it known that I, ABNER JOHNSTON, of Bainbridge, in the county of Chenango and State of New York, have invented certain Improvements in Belt-Fasteners, of which the following is a specification.

This invention relates to that class of belt-fastening devices in which the ends of the belt to be joined are penetrated by teeth formed upon the fastening device, and so arranged as to firmly grip the said ends of the belt to the device itself, so that the latter forms a strong metal connection between the said ends.

My invention comprises certain novel combinations of parts, whereby the attachment of the device to the ends of the belt as aforesaid is rendered extremely secure and without injury to the normal strength of the material of the belt, and also whereby the points of attachment of the device are extended over a comparatively large surface of the belt, in order that the strain of the joint may be borne by a larger portion of the material than is ordinarily secured, thereby giving proportionally-increased strength to the joint.

Figure 1:
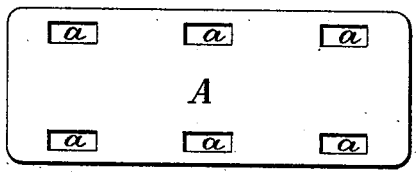
Figure 2:
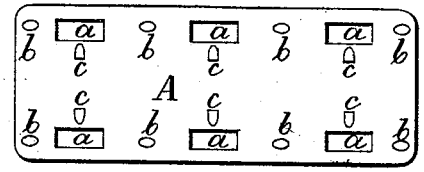
Figure 3:
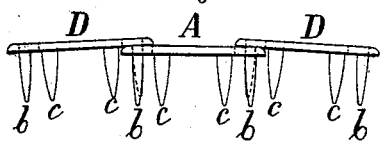
Figure 4:
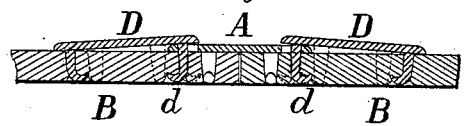
Figure 5:
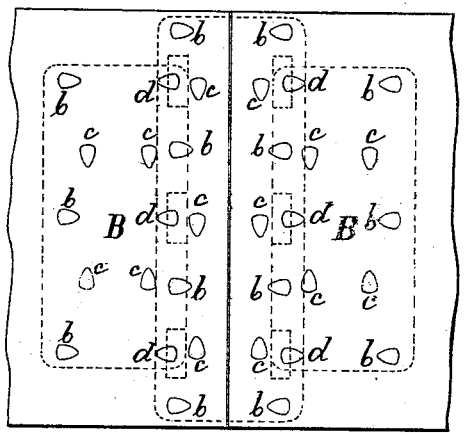
Figure 6:
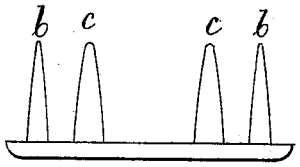

Figures 1 and 2 are views taken from opposite sides of the central or principal plate, which forms an essential element of my said invention. Fig. 3 is a side view, showing the relative position of the said plate with the supplemental plates, which, duly arranged in connection with the central plate, are also included in my said invention. Fig. 4 is a transverse sectional view, showing the manner in which my said invention is applied in joining the ends of the belt. Fig. 5 is an inside view of the belt, showing the arrangement of the fastening-teeth when the fastening device is fixed in place; and Fig. 6 is a detail view on a larger scale, illustrating the shape of the teeth essential in one feature of my said invention.

A is a plate, which may be either flat or slightly curved in its section, taken longitudinal with the belt to which it is to be applied. The lateral edges of this plate may be straight, as shown in the drawings, or may be scalloped. In the said lateral edges are provided slots or openings, the purpose of which will hereinafter appear. On the inner side of the said plates are two or more parallel rows of teeth, $b\ c$. Each tooth is flat and tapering—flat, in order that they may be bent in a definite direction, and tapering and pointed in order that they may more readily pass through the material of the belt. Some of these teeth—as, for example, the teeth $b$—are placed with their flattened sides substantially parallel with the lateral edges of the plate A, while the others are placed with their flattened sides substantially at right angles to said lateral edges, as represented in Fig. 2. From this it follows that the teeth $b$ will bend readily in planes transverse to the plate A, while the teeth $c$ will bend readily in planes longitudinal with the plate A.

In order to join the two ends B B of a belt, the row or rows of teeth adjacent to one lateral edge of the plate A are forced through one end of the belt, while, in like manner, the teeth at the opposite side of said plate A are forced through the opposite end of the belt, the two ends of the belt being brought opposite each other, or "butt-jointed," as it is termed. The teeth $b\ c$ are then bent over or clinched upon the inner side of the belt, the direction of the clinching of the teeth $b$ being at right angles to the clinching of the teeth $c$, so that while the teeth $b$ bend in a direction lengthwise of the belt—that is to say, transverse to the plate A—the teeth $c$ bend in a direction transverse to the belt—that is to say, lengthwise of the plate A—this peculiar arrangement of the clinching of the ends of the teeth securing a much firmer hold upon the ends of the belt, and consequently a much firmer attachment of the said ends of the belt to the plate A, than would be obtained if the teeth were all bent in one direction, or if they were bent merely at hazard. It is to be understood that the plate A is to be formed in one piece with its teeth $b\ c$.

The plate A may be most conveniently made of iron castings, well malleableized, to give toughness to the plate itself and the property of bending to the teeth.

Inasmuch as the plate A, attached as described, causes the strain to be brought, so to speak, upon the material of the belt in two parallel transverse lines, it is necessary, in order to secure greater strength to the joined ends of the belt, that a portion of this strain should be transferred to parts of the belt more remote from the extremities thereof. To secure this there are provided supplemental plates D, which are provided with teeth, substantially the same as the teeth b and c, and which have at one or both of their lateral edges lateral prongs d. These supplemental plates are made of the same material as the plate A, so that the said prongs as well as the teeth are capable of bending. The said prongs d are bent inward substantially at right angles to the supplemental plate D upon which they are formed, and as thus arranged are passed through the opening a in the adjacent edge of the plate A, thence downward through the material of the belt, and, together with the teeth of the said supplemental plate, are bent or clinched at the inner side of the belt, thereby attaching the supplemental plate to the belt itself, with the prongs d firmly hooked through the openings a, and consequently holding upon the plate A, so that a portion of the strain exerted by the plate A at the end of the belt is transferred farther back and sustained by the teeth of the supplemental plate D. In some instances the supplemental plate itself may have behind and connected with it still another plate of like character.

It is of course to be understood that the supplemental plate is to be affixed, as just described, in connection with each lateral edge of the plate A. My invention, as herein described, may not only be employed for joining the ends of belts, but may also be employed for the purpose of strengthening weak portions of belts, the plate A, and any desired number of supplemental plates, being secured to the weak portion of the belt, and extending therefrom lengthwise of the belt until the plates hold in a firm and strong or unimpaired portion thereof. Furthermore, my said invention may be applied for strengthening weak points in harness-straps and other straps when occasion so requires.

In case of repairs, the plate A may be first applied for temporary use, and afterward strengthened by the addition of the plates D.

What I claim as my invention is—

1. A belt-fastening plate provided at each of its two sides with two parallel rows of flattened tapering teeth, the inner rows arranged with their broad faces in planes transverse to the plate, and the outer rows arranged with said faces parallel thereto, the said two rows of teeth being adapted to be bent at right angles to each other, substantially as and for the purpose herein set forth.

2. The plate A, provided with series of suitable teeth, whereby it may be attached by clinching to the belt, and with lateral openings a, in combination with one or more supplemental plates, D, having series of teeth, whereby they may be attached by clinching to the belt, and prongs f, whereby the said supplemental plate or plates may be connected to the plate A through the openings a of the latter, all substantially as and for the purpose herein set forth.

ABNER JOHNSTON.

Witnesses:
THOMAS E. CROSSMAN,
RUDOLF H. RJILLMAN.